United States Patent Office 2,945,866
Patented July 19, 1960

2,945,866

VAT DYESTUFFS OF THE ACEDIANTHRONE SERIES

Armin Caliezi, Basel, and Walter Kern, Sissach, Switzerland, assignors to Ciba Limited, Basel, Switzerland No Drawing. Filed Sept. 30, 1957, Ser. No. 686,829

Claims priority, application Switzerland May 26, 1954

5 Claims. (Cl. 260—351)

This application is a continuation-in-part of copending application Serial No. 510,532 filed May 23, 1955 (Patent No. 2,827,464, granted March 18, 1958).

This invention relates to vat dyestuffs of the acedianthrone series and to a process for their manufacture.

According to the invention valuable vat dyestuffs of the acedianthrone series are obtained when approximately 1 mol of a dihalogen anthraquinone is reacted with 2 mols of a mono-amino-acedianthrone or 1 mol of a mono-amino-acedianthrone and 1 mol of another amino-anthraquinone. For example 1:5-, 2:6- or 2:7- dichloro- or -dibromanthraquinone or 6-Bz-1-dibromobenzanthrone, have proved to be suitable dihalogen anthraquinone compounds for use according to this invention.

In the process of the invention 1 mol of such a dihalogen anthraquinone compound is reacted either with 2 mols of a mono-amino-acedianthrone or 1 mol of a mono-amino-acedianthrone and 1 mol of another aminoanthraquinone. As suitable aminoanthraquinones there may be mentioned 1- or 2-aminoanthraquinone and 1-amino-4- or -5-benzoylaminoanthraquinone.

The mono-amino-acedianthrones to be used as starting materials can be obtained by mononitration of acedianthrone of the formula

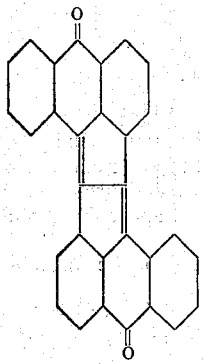

in sulfuric acid or an organic solvent such as nitrobenzene and reduction of the resulting nitro compound.

The condensation of the specified components is advantageously carried out in a high boiling solvent such as nitrobenzene, naphthalene, anthracene or phenanthrene, advantageously with the addition of acid-binding agents such as sodium carbonate and catalytic quantities of copper salts and copper powder. The most favourable range of temperature is between 100 and 350° C.

The products obtained by the present process correspond to the general formula

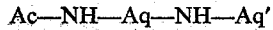

in which Ac indicates an acedianthrone radical in which the NH-group occupies the same position as the nitro group in the nitro-acedianthrone, Aq stands for an anthraquinone radical and Aq' is a radical of an anthraquinone compound, preferably an acedianthrone radical.

These products constitute valuable brown vat dyestuffs which can be used for the dyeing of a wide variety of materials, more especially natural and regenerated cellulose. They can also be used as pigments. These dyestuffs are particularly suitable for printing and give brown prints in which there is no damage to the fiber and the colors are strong.

The following examples illustrate the invention, the parts and percentages being by weight unless otherwise stated and the relation of part by weight to part by volume being the same as that of the kilogram to the liter.

Example 1

2.77 parts of 2:7-dichloranthraquinone, 8.4 parts of amino-acedianthrone, 1 part of copper powder, 1.5 parts of sodium carbonate and 100 parts of nitrobenzene are heated for 17 hours to 200–220° C. The mixture is then allowed to cool to 100° C. and the precipitated dyestuff filtered off. It is washed with nitrobenzene and alcohol and then extracted by boiling with dilute hydrochloric acid. After drying, 9.2 parts of a brown powder are obtained which dyes and prints cotton a very strong reddish brown. The dyestuff has the formula

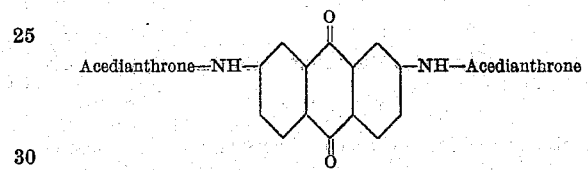

By using, instead of 2:7-dichloranthraquinone, 2:6-dichloranthraquinone, a dyestuff of the formula

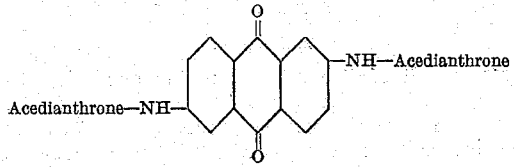

having similar properties is obtained.

Example 2

60 parts of nitrobenzene, 3.3 parts of 2:7-dichloranthraquinone, 5 parts of amino-acedianthrone, 2.7 parts of 1-amino-anthraquinone, 0.6 part of copper powder and 2.7 parts of sodium carbonate are heated for 20 hours to 210–220° C. and then worked up as in Example 1. 8.5 parts are obtained of a brown powder which dyes and prints cotton in fast red brown shades. The dyestuff has the formula

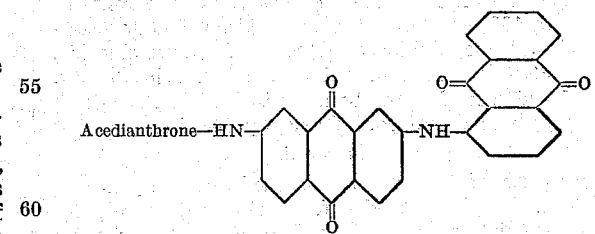

Example 3

100 parts of naphthalene, 6 parts of amino-acedianthrone, 2.7 parts of 6-Bz-1-dibromobenzanthrone, 0.5 part of cuprous chloride, 0.5 part of copper powder and 1 part of sodium carbonate are heated under reflux for 20 hours. The mixture is then allowed to cool to 180° C., 100 parts of chlorobenzene added and the precipitated dyestuff filtered off at 80° C. After working up as described in Example 1, a black brown powder is obtained which dyes and prints cotton in strong red brown shades. The dyestuff has the formula

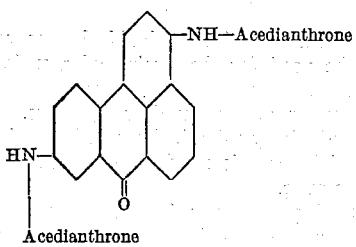
Acedianthrone

Example 4

100 parts of nitrobenzene, 8.2 parts of amino-acedianthrone, 2.8 parts of 1:5-dichloranthraquinone, 1 part of copper powder and 1.5 parts of sodium carbonate are heated for 17 hours to 210–220° C. and then worked up as described in Example 1. A dyestuff having the formula

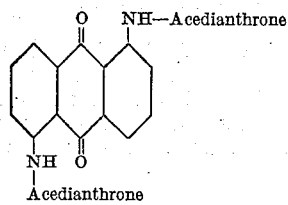
Acedianthrone is obtained which dyes and prints cotton in fast, yellowish brown shades.

Example 5

1 part of the dyestuff prepared according to Example 4 is stirred in 10 parts of chlorsulfonic acid for 20 hours at 20° C. The solution is then poured on ice and water and the precipitated dyestuff isolated. It dyes cotton from the vat in strong, fast red brown shades.

Example 6

Into a melt of 40 parts of aluminum chloride and 8 parts of sodium chloride are introduced at 120° C., 2 parts of the dyestuff prepared according to Example 4. After the melt has been stirred for 1 hour at 120° C., it is poured on ice and water. By the addition of hydrochloric acid the aqueous mixture is rendered acid and it is then heated for ½ hour to 80° C. and the dyestuff filtered off. It dyes cotton in a fast brown of strong color.

Example 7

1 part of the dyestuff obtained according to Example 1 is vatted in 100 parts of water with the addition of 4 parts by volume of 30% sodium hydroxide solution with 2 parts of sodium hydrosulphite at 45° C. The resulting stock vat is added to a solution of 4 parts by volume of 30% sodium hydroxide solution and 2 parts of sodium hydrosulphite in 2,000 parts of water. In the resulting dye bath 100 parts of cotton are dyed for 1 hour at 40–50° C. with the addition of 10 parts of sodium chloride. The cotton is then squeezed out, oxidized in the air, rinsed and soaped at the boil. It is dyed in strong reddish brown shades of good fastness properties.

Example 8

200 parts of the dyestuff obtained according to Example 1, in a finely divided form, are mixed to a paste with 100 parts of water, 600 parts of a potash thickening (prepared from 90 parts of wheat starch, 330 parts of water, 100 parts of glycerol, 140 parts of British gum, 170 parts of tragacanth mucilage and 170 parts of potassium carbonate) and 100 parts of hydrosulphite. A cotton fabric is printed with this paste. After printing, the fabric is dried with moderate heat and then steamed at 101–103° C. for 5–10 minutes in air-free, wet steam, rinsed in running water until the dyestuff is re-oxidized and soaped at the boil. A strong, fast red brown print is obtained.

What is claimed is:

1. A vat dyestuff of the formula

Ac—NH—Aq—NH—Ac in which Ac indicates an acedianthrone radical in which the —NH-group occupies the same position as the nitro group in the mononitro-acedianthrone obtained by mononitration of acedianthrone and reduction of the resulting nitro compound, and Aq stands for a member selected from the group consisting of the anthraquinonyl and benzanthronyl radicals.

2. The vat dyestuff of the formula

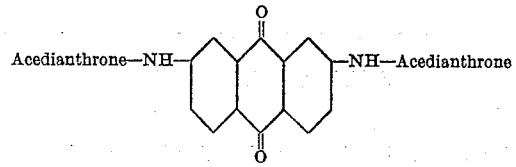

wherein the —NH-group occupies the same position on its adjacent acedianthrone radical as does the nitro group on the mononitro-acedianthrone obtained by mononitration of acedianthrone and reduction of the resulting nitro compound.

3. The vat dyestuff of the formula

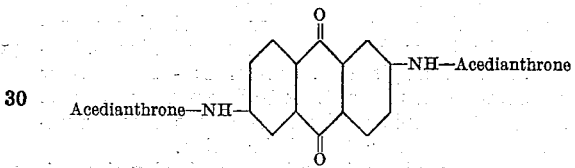

wherein the —NH-group occupies the same position on its adjacent acedianthrone radical as does the nitro group on the mononitro-acedianthrone obtained by mononitration of acedianthrone and reduction of the resulting nitro compound.

4. The vat dyestuff of the formula

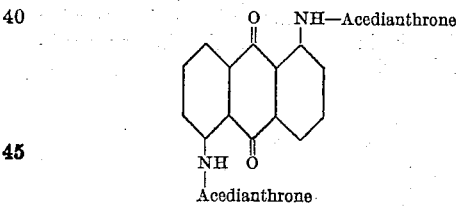
Acedianthrone wherein the —NH-group occupies the same position on its adjacent acedianthrone radical as does the nitro group on the mononitro-acedianthrone obtained by mononitration of acedianthrone and reduction of the resulting nitro compound.

5. The vat dyestuff of the formula

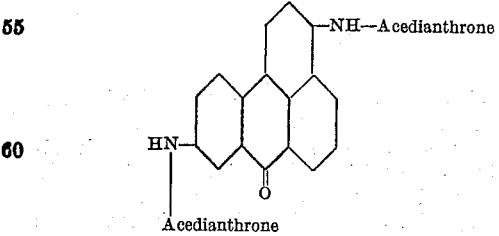
Acedianthrone wherein the —NH-group occupies the same position on its adjacent acedianthrone radical as does the nitro group on the mononitro-acedianthrone obtained by mononitration of acedianthrone and reduction of the resulting nitro compound.

References Cited in the file of this patent

UNITED STATES PATENTS 2,827,644    Caliezi et al. _____ Mar. 18, 1958

FOREIGN PATENTS 672,906    Great Britain _____ May 28, 1952